United States Patent [19]

Guy et al.

[11] Patent Number: 5,018,242
[45] Date of Patent: May 28, 1991

[54] SPRING-ACTION HINGE FOR SPECTACLE FRAME

[75] Inventors: Gabriel Guy, Vegy-Foncenex, France; Conrad Zellweger, Chene-Bougeries, Switzerland

[73] Assignee: LN Industries S.A.

[21] Appl. No.: 329,643

[22] Filed: Mar. 28, 1989

[30] Foreign Application Priority Data

Apr. 29, 1988 [CH] Switzerland .................. 1608/88

[51] Int. Cl.⁵ ............................................. G02C 5/22
[52] U.S. Cl. .................................. 16/228; 351/113; 351/121
[58] Field of Search .................. 16/228; 351/153, 121, 351/113

[56] References Cited

U.S. PATENT DOCUMENTS 4,747,183  5/1988  Drlik .................................. 351/113

FOREIGN PATENT DOCUMENTS 2340026  9/1977  France .............................. 351/121

Primary Examiner—Robert L. Spruill
Assistant Examiner—Carmine Cuda
Attorney, Agent, or Firm—Young & Thompson

[57] ABSTRACT

The elastic hinge comprises a hinge element (5) fixed to the front part of a spectacle frame and a hinge element (8) integral with a rod (11) inserted in the bore (9) of a housing (10). The rod (11) is pressed to the rear of the temple by a spring (16) which presses on the one hand against a collar (17) integral with the rod (11) and on the other hand against a ring (25) having a rib (26) which engages elastically on a shoulder (27). As a result of this arrangement, the fitting of the elastic assembly in the bore (9) is substantially simplified.

5 Claims, 2 Drawing Sheets

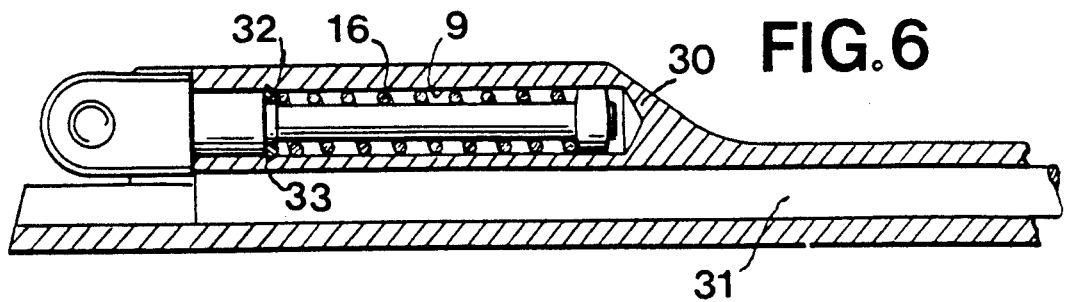
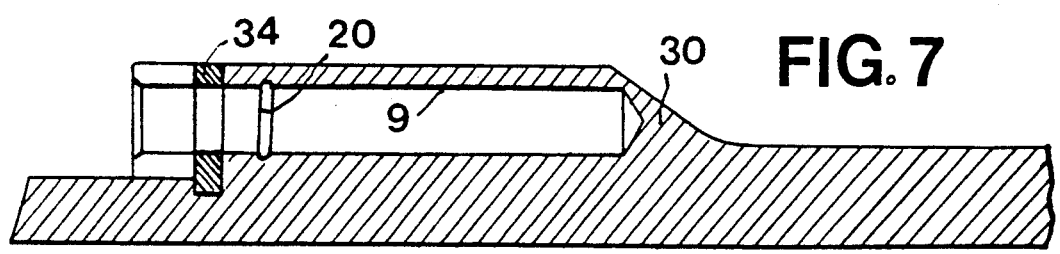
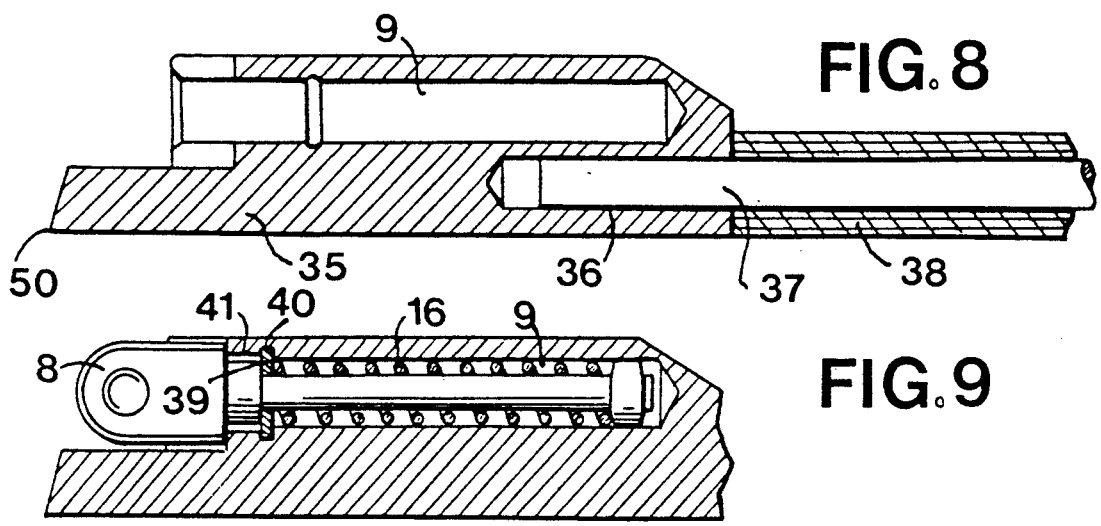
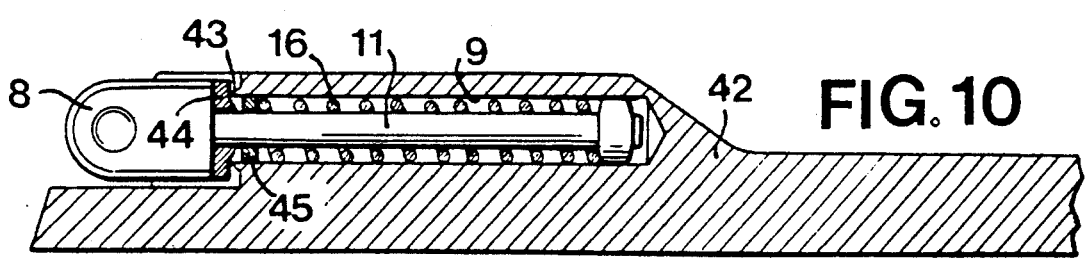
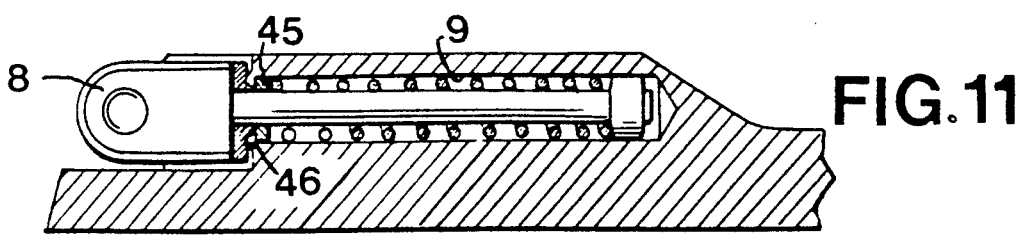

SPRING-ACTION HINGE FOR SPECTACLE FRAME

Spring-action hinges for spectacle frames are already known which comprise two hinge elements, one of which is to be fixed to the front part of the frame and the other to be connected to a temple by means of an elastic element, comprising a housing extending longitudinally to the temple, whereby a rod-shaped part is integral with the hinge element and is slidingly mounted in said housing, and a compression spring surrounds said rod inside the housing and, one the one hand, presses on a surface integral with the rod and one the other hand, presses on a surface integral with the housing.

The purpose of the invention is to facilitate the assembly operations for this type of hinge. To this end, the hinge forming the subject of the invention is characterized in that the end of the rod opposite to that of the end integral with the hinge element has a portion with a larger straight section in order to form one of the pressure surfaces, the other pressure surface comprising a part engaged in the housing and made integral with the inner wall of the latter, by deformation of the part and/or housing.

The attached drawing represents schematically and as an example several embodiments of the hinge which is subject of the invention.

FIGS. 6 to 11 show other embodiments.

Figure 1:
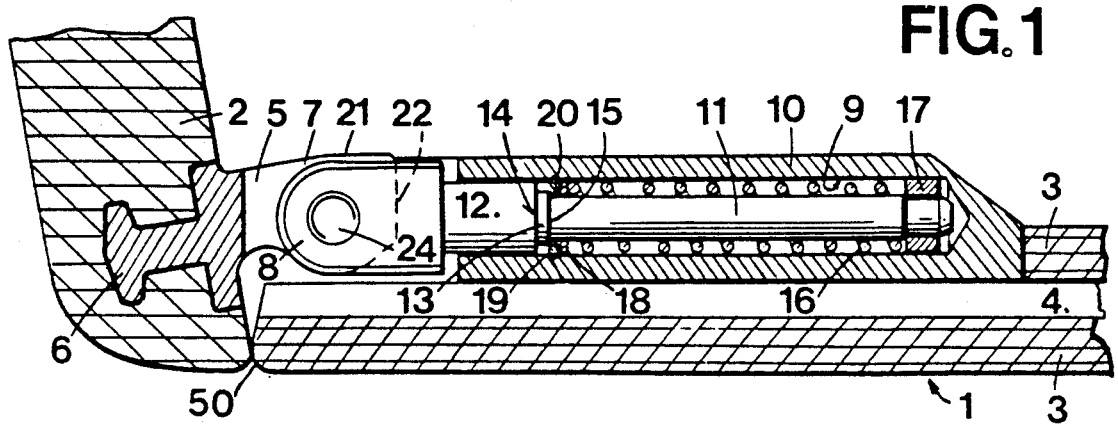
FIG. 1 is a cross-sectional view of the hinge according to the first embodiment after assembly.

The hinge illustrated in FIG. 1 connects a temple 1 to the front frame of a pair of spectacles. The temple 1 comprises a synthetic resin part 3 in which is located a metal reinforcement 4.

A female hinge element 5 has a fixing portion 6 embedded in the front part 2. Said hinge element is provided with two lugs, only one 7 of which is visible on the drawing, between which is engaged a male hinge element 8 slidingly mounted in a cylindrical bore 9 of a housing 10 which is fixed to the metal reinforcement 4 for example by welding.

The hinge element 8 forms one piece with a rod 11 which, on the hinge element side, has two portions 12 and 13 which determine two shoulders 14 and 15. The rod 11 passes inside a helicoidal spring 16, the rear portion of which presses against a collar 17 integral with said rod and of which the outside diameter corresponds to the inside diameter of the cylindrical bore 9 in order to be able to slide therein. The other end of the spring 16 presses against an annular part 18 which has a part engaged in an elastic split ring 19 which is partly engaged in a groove 20 provided in the inner wall of the housing 10. As can be seen, the annular part 18 has a circular rib which forms a pressure surface for the spring 16.

It should be further noted that the lugs 7 of the hinge element 5 have two straight portions 21 and 22, against which the end of the housing 10 presses under the effect of the force exerted by the spring 16, in order to determine, as is well known per se, the opening and closing positions of the temples of the spectacles. This hinge enables the temple to elastically go beyond its normal opening position. The front end of the temple 3 strikes at 50 against the front part 2, and the temple can pivot around this point 50 against the elastic force of the spring 16 which is transmitted by hinge element 8 to hinge element 5.

Figure 2:
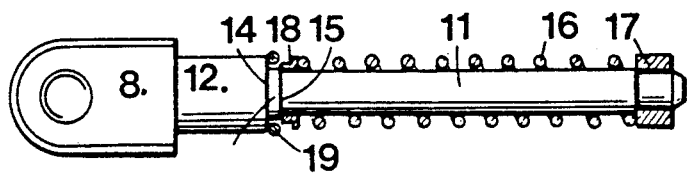
FIGS. 2, 3 and 4 are views showing the operations of assembly of this hinge.

The hinge shown is very attractive since it can be pre-assembled as shown in FIG. 2. Over the rod 11 is inserted, from the rear, the elastic split ring 19, which is held towards the front by the shoulder 14. Then the annular part 18, which can strike against the shoulder 15, is placed on; next, the spring 16 is slid on to the rod and it is compressed by applying the collar 17 which can be simply forced on to the rear end of the rod 11, or also can be held on the latter by any suitable means, such as welding, bonding or riveting.

Figure 3:
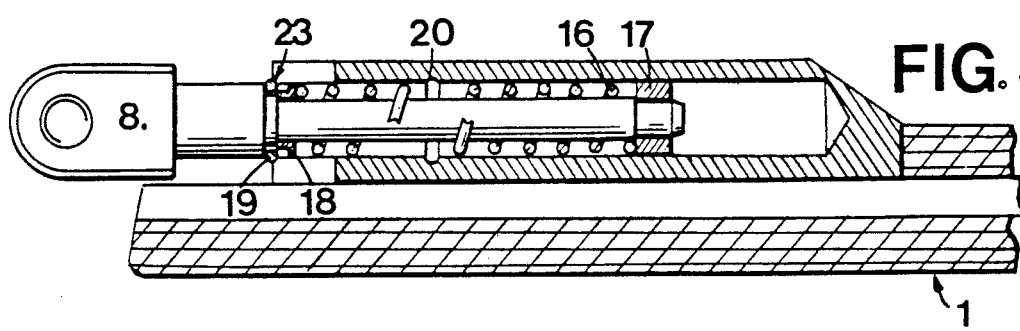

Next, the rod 11 carrying the split elastic ring 19, the annular part 18, the spring 16 and the collar 17, is fed into the bore 9, as shown in FIG. 3. The open end of the bore has a chamfer 23 which forms a ramp, so that by further pressure of the roB 11 into the housing 10 the split ring 19 closes tighter radially in order to penetrate into the bore 9.

Figure 4:
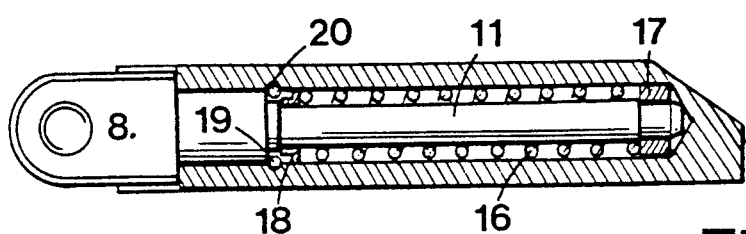

The rod 11 is then pushed to the bottom of the bore 9, as shown in FIG. 4 and the split ring is then situated opposite the groove 20. Owing to its elasticity it extends radially and penetrates in particular into the groove 20. When the rod 11 is slightly withdrawn to the rear the annular part 18 moves and enters inside the ring 20, i.e. into the position shown in FIG. 1. Next, the hinge element 8 is connected in the usual manner to the hinge element 5 by means of a pivot screw 24.

Figure 5:
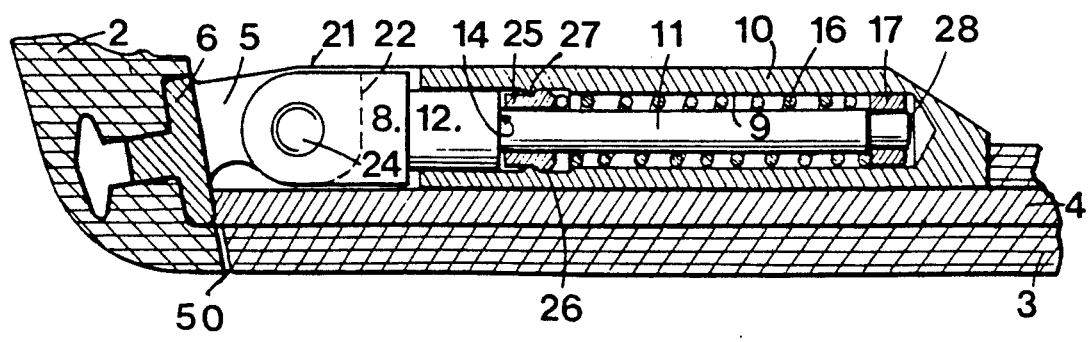
FIG. 5 is a cross-section of a second embodiment.

In the embodiment of FIG. 5, the parts corresponding to the first embodiment are identified by the same reference figures. The essential differences in relation to FIG. 1 are that the ring 19 and the annular part 18 are replaced by a ring 25 in synthetic resin having sufficient elasticity to be able to penetrate inside a rib 26 in which it engages by a shoulder 27. In this way, the rod 11 now has only one portion 12 of larger diameter, portion 13 of the first embodiment having become unnecessary. It can furthermore be remarked that, in this second embodiment, the collar 17 is held on the rod 11 by riveting, this being achieved by crushing the rear end of this rod in order to form an edge 28.

FIG. 6 is a partial illustration of a variant in which the bore 9 of the hinge is produced directly in a plastic temple. This temple has a metal frame 31. The retaining portion of the spring 16 is made of a washer 32, having a truncated-cone periphery, in order to obtain an annular ring 33 with a diameter slightly larger than that of the bore 9. In this embodiment, the elastic assembly is force-fitted and the washer 32 deforms the wall of the bore 9 until it assumes the position illustrated in the figure. As a result of the pressure exerted by the spring 16 on the washer 32, the edge 33 of the latter sinks into the plastic and holds the assembly in the desired position.

FIG. 7 shows another embodiment in which the temple 30 is not provided with a metal reinforcement, whereas the open end of the bore 9 consists of a plate 34 of a harder material than that of the temple 30 to avoid wear by the parts 21 and 22 of the lugs 7. This plate 34 can, for example, be made of stainless steel, nickel-silver or also Delrin.

FIG. 8 shows part of a hinge in moulded plastic, forming the housing 35, with two blind recesses, parallel to one another and opening respectively on to the opposite ends of this housing 35. One of these recesses is formed by the bore 9 designed to receive the elastic part of the hinge, while the other recess is a blind hold 36 designed to receive the end of a rod 37 forming the reinforcement of a temple 38. This reinforcement 37 can be fitted in the hole 36 for example by bonding. The housing 35 has an end portion 50 designed to press on the front part of the frame to determine the normal opening position of the temple.

FIG. 9 represents a variant in which the spring 16 is held by a washer 39, the periphery of which is engaged in a circular groove 40 provided in the bore 9. To enable fitting of the elastic assembly in the bore 9, the washer 39 is initially conical, so that its outside diameter is smaller than that of part 41 of the bore 9. The assembly can thus be inserted into this bore and when the periphery of the washer 39 strikes against the annular shoulder formed by an edge of the groove 40, sufficient pressure is exerted on the hinge element 8 to distort the conical washer in order to convert it into a flat washer engaged in the groove 40.

FIGS. 10 and 11 show a variant in which the bore 9 is provided in an end of a metal temple 42. As seen from FIG. 10, the bore 9 ends at its open extremity in an annular rib 43, against which presses a washer 44 of hard material arranged on the rod 11 and acting as a crimping tool. The rod also carries a washer 45 acting as a support for the spring 16. During assembly of the elastic element, sufficient pressure is exerted on the hinge element 8 to distort the rib 43 and to effect crimping 46, which holds the washer 45 inside the bore 9.

Naturally, numerous other embodiments can be realized. Thus, in a design derived from FIG. 9, the housing could have a recess with a rectangular cross-section, and the washer 39 could be replaced by a curved plate, designed to be straightened in order to engage in notches.

We claim:

1. In a spring-action hinge for spectacle frame, comprising two hinge elements, one of which is designed to be fixed to the front part of the frame, the other hinge element being connected to a temple by means of an elastic element, comprising a housing extending longitudinally to the temple, a rod-shaped part integral with the hinge element at one end and slidingly mounted in said housing, a compression spring surrounding said rod inside the housing and on the one hand, pressing on a surface integral with the rod, and, on the other hand, pressing on a surface integral with the housing; the improvement wherein the end of the rod, opposite to the end which is integral with the hinge element, has a portion with an enlarged straight section to form one of the pressure surfaces, the other pressure surface comprising a part engaged in the housing and made integral with the inner wall of the latter, by deformation of at least one of the part and housing, wherein the inner wall of the housing has a notch in which a portion of said part is engaged, and wherein the inner wall of the housing is circularly cylindrical, the notch being formed by a groove in this inner wall, whereby said part comprises a split elastic ring engaged in said groove and surrounding the rod.

2. In a spring-action hinge for spectacle frame, comprising two hinge elements, one of which is designed to be fixed to the front part of the frame, the other hinge element being connected to a temple by means of an elastic element, comprising a housing extending longitudinally to the temple, a rod-shaped part integral with the hinge element at one end and slidingly mounted in said housing, a compression spring surrounding said rod inside the housing and on the one hand, pressing on a surface integral with the rod, and, on the other hand, pressing on a surface integral with the housing; the improvement wherein the end of the rod, opposite to the end which is integral with the hinge element, has a portion with an enlarged straight section to form one of the pressure surfaces, the other pressure surface comprising a part engaged in the housing and made integral with the inner wall of the latter, by deformation of at least one of the part and housing, wherein the rod presents a portion of enlarged diameter on the hinge element side, whereby a ring is engaged on the rod to be able to press against this portion of larger diameter, an elastically deformable notch being provided between the inner wall of the housing and the periphery of this ring, whereby an annular end face of this ring forms the support surface for the spring.

3. In a spring-action hinge for spectacle frame, comprising two hinge elements, one of which is designed to be fixed to the front part of the frame, the other hinge element being connected to a temple by means of an elastic element, comprising a housing extending longitudinally to the temple, a rod-shaped part integral with the hinge element at one end and slidingly mounted in said housing, a compression spring surrounding said rod inside the housing and on the one hand, pressing on a surface integral with the rod, and, on the other hand, pressing on a surface integral with the housing; the improvement wherein the end of the rod, opposite to the end which is integral with the hinge element, has a portion with an enlarged straight section to form one of the pressure surfaces, the other pressure surface comprising a part engaged in the housing and made integral with the inner wall of the latter, by deformation of at least one of the part and housing, wherein the inner wall of the housing has a notch in which a portion of said part is engaged, and wherein the part engaged in the housing is non-flat in order to be able to be inserted in the latter until it contacts a recess in the inner wall of the housing provided essentially at the height of the notch, whereby the rod which has a portion of enlarged diameter enables pressure to be exerted against the non-flat piece to press it by making it flat, so that its edge penetrates in said notch.

4. In a spring-action hinge for spectacle frame, comprising two hinge elements, one of which is designed to be fixed to the front part of the frame, the other hinge element being connected to a temple by means of an elastic element, comprising a housing extending longitudinally to the temple, a rod-shaped part integral with the hinge element at one end and slidingly mounted in said housing, a compression spring surrounding said rod inside the housing and on the one hand, pressing on a surface integral with the rod, and, on the other hand, pressing on a surface integral with the housing; the improvement wherein the end of the rod, opposite to the end which is integral with the hinge element, has a portion with an enlarged straight section to form one of the pressure surfaces, the other pressure surface comprising a part engaged in the housing and made integral with the inner wall of the latter, by deformation of at least one of the part and housing, wherein the housing is formed by a bore (9), the open end of which ends in an annular rib (43), whereby the rod (11) carries a part (44) acting as a tool to bend by pressure said rid (43) to distort it in the direction of the axis of the bore (9).

5. In a spring-action hinge for spectacle frame, comprising two hinge elements, one of which is designed to be fixed to the front part of the frame, the other hinge element being connected to a temple by means of an elastic element, comprising a housing extending longitudinally to the temple, a rod-shaped part integral with the hinge element at one end and slidingly mounted in said housing, a compression spring surrounding said rod inside the housing and on the one hand, pressing on a surface integral with the rod, and, on the other hand, pressing on a surface integral with the housing; the improvement wherein the end of the rod, opposite to the end which is integral with the hinge element, has a portion with an enlarged straight section to from one of the pressure surfaces, the other pressure surface comprising a part engaged in the housing and made integral with the inner wall of the latter, by deformation of at least one of the part and housing, wherein the housing is formed of a single part having two longitudinal and mutually parallel recesses, opening respectively on to opposite ends of the housing, one of these recesses containing the spring device, and the other recess being designed to receive an end of a temple reinforcement.

* * * * *